United States Patent [19]
Beard et al.

[11] Patent Number: 5,149,390
[45] Date of Patent: Sep. 22, 1992

[54] NON-COLLAPSIBLE TIRE BUILDING DRUM

[75] Inventors: George W. Beard; Frank Hamer, both of Gravenhurst, Canada

[73] Assignee: Gravenhurst Plastics Ltd., Ontario, Canada

[21] Appl. No.: 644,194

[22] Filed: Jan. 22, 1991

Related U.S. Application Data

[63] Continuation-in-part of Ser. No. 409,320, Sep. 19, 1989, abandoned.

[51] Int. Cl.$^5$ .............................................. B29D 30/24
[52] U.S. Cl. .................................................. 156/414
[58] Field of Search ................ 156/414, 416, 425; 29/110, 115, 124, 132, 129, 129.5; 301/64 R, 73; 249/175, 177; 180/20

[56]     References Cited

U.S. PATENT DOCUMENTS

| | | | |
|---|---|---|---|
| 558,327 | 4/1896 | Tower .................. | 301/64 R |
| 969,131 | 8/1910 | Cobb .................... | 156/414 X |
| 3,151,013 | 9/1964 | Nebout ................. | 156/414 X |
| 4,060,445 | 11/1977 | Houck et al. ......... | 156/414 |
| 4,090,909 | 5/1978 | Christie et al. ....... | 156/414 |
| 4,511,184 | 4/1985 | Schauf et al. ........ | 301/64 R |
| 4,636,277 | 1/1987 | Owen et al. .......... | 156/417 |

*Primary Examiner*—Geoffrey L. Knable
*Attorney, Agent, or Firm*—Ezra Sutton

[57]     ABSTRACT

A novel non-collapsible tire building drum is provided herein. The drum is a cylindrical tire building drum consisting of: non-inflatable, non-collapsible, rigid, non-reactive, vulcanization-resistant, unreinforced, synthetic thermoplastic material shell, the shell being of the same diameter between its two axial ends and also providing a smooth surface between its two axial ends, the shell having a particular specified uniform cylindrical shape, and a central, axially-longitudinally-extending core of a non-circular cross-section. The core is specially adapted for mounting the cylindrical tire building drum on a rotatable, axially-longitudinally-extending shaft of a conventional tire building machine. The core has a plurality of integral, fixed-length, rigid, non-movable, radially-outwardly-projecting, axially-longitudinally-extending ribs, the ribs projecting radially between the core and the shell, each such rib being connected to its associated face of the central core and to the shell of the cylindrical tire building drum at a thickened area of greater cross-sectional area than the cross-sectional area of the other portions of each rib at both side faces of each rib, thereby to provide rugged reinforcement areas. The cylindrical tire building drum has an axially-longitudinally-extending length which varies from about 1 foot to about 20 feet.

4 Claims, 1 Drawing Sheet

NON-COLLAPSIBLE TIRE BUILDING DRUM

BACKGROUND OF THE INVENTION (i) Related Invention

This application is a continuation-in-part of Application Ser. No. 409,320 filed Sep. 19, 1989 now abandoned.

(ii) Field of the Invention

The present invention relates to a building drum for tires and cylindrical articles having axially-spaced beads therein.

(iii) Description of the Prior Art

Building drums for building tires are well known. Many types, styles, and arrangements are in common use, and even more are described in numerous patents.

Tire building drums generally have a cylindrical body, rotatable about its axis and upon the cylindrical surface of which tire carcasses are assembled. The layers of tire carcasses are then removed to be formed into tires which are then vulcanized. In order to facilitate removal of constructed carcasses from the drum, the cylindrical body of the drum is usually collapsible. Tire building drums generally fall into either of two categories known respectively as rotary (or inertia) collapse drums and radial collapse drums.

The cylindrical body of a tire building drum has heretofore been formed in a number of axially-extending segments. In the rotary collapse drum, the segments are connected by means of pivoting links to a hub, pivoting of the links generating collapsing or expanding movement of the segments. In the radial collapse drum, the segments are supported on radially-extending pillars or slides, and, during collapsing and expanding movement of the segments, the segments are moved radially, by operation of a collapsing mechanism with respect to the rotational axis of the drum.

Both types of drums have a main shaft by means of which the drum is mounted, and through which rotational movement is transmitted to the drum. In the rotary collapse drum, the arrangement of pivoting links lends itself readily to the provision of a hollow outer shaft through which the main shaft passes, the hollow outer shaft being coupled to the collapsing mechanism of the drum so that relative rotation between the outer hollow shaft and the main shaft operates the collapsing mechanism either to collapse, or expand the segments of the drum. In the radial collapse drum, however, the internal structure necessitates, in order to achieve a firm and accurate support of the segments, a hub having parts adjacent each axial end of the segments by means of which the segments are supported. The collapsing mechanism is disposed between the two hub portions, and in order to transmit movement to the collapsing mechanism in the radial collapse drum the main shaft and hub are hollow and receive an inner shaft which is connected to the collapsing mechanism by way of a radial aperture in the wall of the hub.

In addition, many known building drums accommodate only one width, that is, provide no means for adjusting the axial face width of the drum to suit different spacings between the beads of a tire carcass to be built thereon. Other building drums provide means for adjusting the axial face width to accommodate tire carcasses of differing axial widths between beads. Such width-adjustable building drums, however, require that some part or parts be moved axially relative to other parts of the drum and in consequence require an interruption of, and time lost from, the potential productivity of the building drum.

In addition to the above problems with tire building drums, other problems arose from the nature of the material out of which the tire building drum had heretofore been made. Thus, if the drum were made of wood (to minimize the weight of the drum) splinters were formed which were detrimented to the tire carcass being formed. If the drums were made of metal, e.g., steel instead of wood to solve the splinter problem, the drums were of excessive weight.

U.S. Pat. No. 4,060,445 patented Nov. 29, 1977 by S. J. Houck et al attempted to provide a solution to those problems by providing a tire building drum, free of axially-movable parts for building tire carcasses and cylindrical articles having inextensible beads of given diameter therein but spaced axially any selected distance apart. The patented tire building drum had a single axially and circumferentially continuous radial expandable membrane overlying a thick-walled cylinder of deformable rubbery material, the full axial length of which was expandable radially to wrap the membrane against beads placed about the drum and to divide the membrane into a non-inflatable centre section and two inflatable end sections each axially outboard of a respective bead. The thick-walled cylinder was expanded radially by inflating an axially-extending cylindrical sleeve within control members in the form of four semi-cylindrical strips which prevented bulging outward of the central portion of the thick-walled cylinder and which engaged cylindrical flanges of a pair of end rings spaced along the drum's centre shaft.

U.S. Pat. No. 4,090,909 patented May 23, 1978 by C. E. Christie et al attempted to solve this problem by providing a rigid fixed diameter cylindrical drum for building a tire band, i.e., a straight cylindrical ply assembly without bead rings or other circumferentially-inextensible elements subsequently to be a part of a complete tire. The cylindrical surface of the drum was knurled in a coarse diamond-toothed pattern. Perforations or orifices for air pressure and flow were also provided.

U.S. Pat. No. 4,636,277 patented Jan. 13, 1987 by M. E. Owen et al provided a radial collapse tire building drum having a hub, a plurality of axially-extending cylindrical body segments disposed around the hub, a first radial support at one axial end of the hub and supporting one axial end of the segments, a second radial support at the other axial end of the hub and supporting the other axial ends of the segments, and a collapsing mechanism disposed within the drum between the first and second radial supports and operable to move the segments either radially outwardly with respect to the hub form a cylindrical body concentric with the hub, or radially inwardly towards the hub to collapse the cylindrical body of the drum. A main drive shaft was secured to the hub with its axis co-extensive with the hub axis and there is a hollow shaft through which the main drive shaft extends. A drive transmission extended between the circumferentially adjacent, radially extending supports of the first radial support means to provide a drive connection between the hollow shaft and the collapsing mechanism for transmitting rotational movement of the hollow shaft relative to the main shaft to operate the collapsing mechanism.

SUMMARY OF THE INVENTION (i) Aims of the Invention

The present invention, on the other hand, proposes to solve the above-stated problem in an entirely different way.

(ii) Statements of Invention

The tire building drum of this invention is a cylindrical tire building drum having two axial ends, the tire building drum consisting of: non-inflatable, non-collapsible, rigid, non-reactive, vulcanization-resistant, unreinforced, synthetic, thermoplastic material shell, the shell being of the same diameter between its two axial ends and also providing a smooth surface between its two axial ends, the shell having a) an axially-longitudinally-extending smooth outer circumferential face; b) an axially-longitudinally-extending inner circumferential face; c) a central, axially-longitudinally-extending core of a non-circular cross-section, the core having an inner, axially-longitudinally-extending face, and an outer, axially-longitudinally-extending face, the core being specially adapted for mounting the cylindrical tire building drum on a rotatable, axially-longitudinally-extending shaft of a conventional tire building machine, the core having d) a plurality of integral, fixed-length, rigid, non-movable, radially-outwardly-projecting, axially-longitudinally-extending ribs, the ribs projecting radially between the outer axially-longitudinally-extending face of the central core and the axially-longitudinally-extending inner circumferential face of the shell, each radially-projecting, axially-longitudinally-extending rib being connected to its associated face of the axially-longitudinally-extending central core and to its associated axially-longitudinally-extending inner circumferential face of the cylindrical tire building drum at a thickened area of greater cross-sectional area than the cross-sectional area of the other portions of each rib at both side faces of each the rib, thereby to provide rugged reinforcement areas; the cylindrical tire building drum having an axially-longitudinally-extending length which varies from about 1 foot to about 20 feet.

(iii) Further Features of the Invention

In one feature of this invention, the non-reactive, vulcanization-resistant, unreinforced synthetic thermoplastic material comprises unreinforced polyvinyl chloride, high density polyethylene, polypropylene, or nylon.

In another feature of this invention the central core may be hollow square-shaped core; wherein eight ribs are provided; wherein four of the eight ribs extend radially, perpendicularly-outwardly from a respective side wall of the square-shaped core; and wherein the other four of the ribs extend radially, diagonally-outwardly from an associated corner of the square-shaped core.

In such embodiment, each radially, perpendicularly-outwardly-extending rib extends from the centre of a respective side wall.

BRIEF DESCRIPTION OF THE INVENTION

Figure 1:
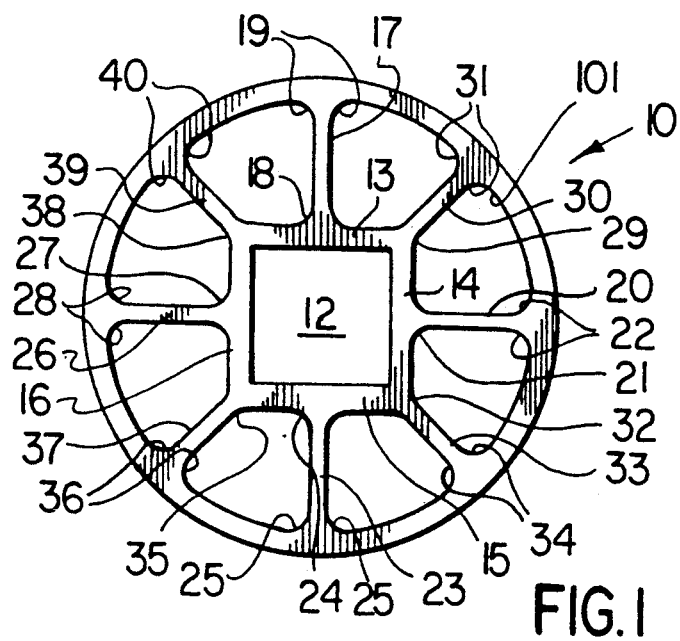
FIG. 1 is a cross-sectional view of the tire building drum of one aspect of this invention.
Figure 2:
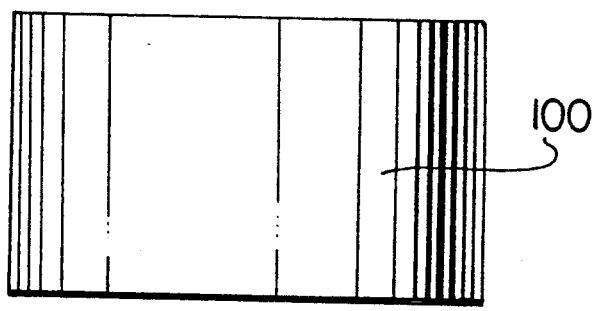
FIG. 2 is a top plan view thereof.
Figure 3:
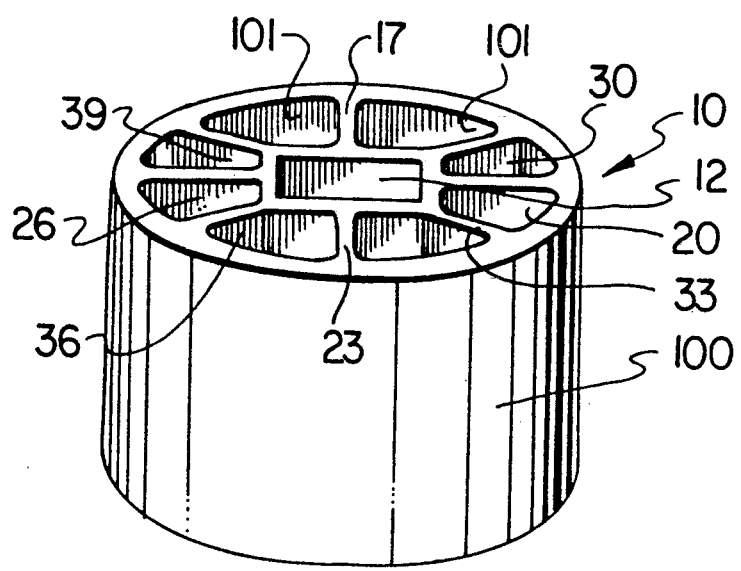
FIG. 3 is a perspective view thereof.

DESCRIPTION OF PREFERRED EMBODIMENTS (i) Description of FIGS. 1, 2 and 3

As seen in FIGS. 1, 2 and 3, the tire building drum 10 comprises a rigid, synthetic plastic material shell. The rigid, synthetic plastic material is one which is heat-stable, and non-reactive under the tire building conditions, e.g., it may be polyvinyl chloride, high density polyethylene, polypropylene, nylon, etc. These materials are unreinforced.

(ii) Description of FIG. 1

The cross-sectional view of the tire building drum 10 shown in FIG. 1 displays a shell 100 and a central, hollow, square-shaped core 12. While the core 12 is shown to be square-shaped, it can be of any geometrical shape which can be non-rotationably associated with a rotatable shaft, e.g. pentagonal, hexagonal, octagonal, etc.

Square-shaped core 12 includes four longitudinally-extending walls 13, 14, 15 and 16 and eight ribs are provided between the core 12 and the shell 100. Four of the eight ribs extend radially, perpendicularly-outwardly. Thus, extending radially, perpendicurlarly-outwardly from the centre of wall 13 is a rib 17, which extends from a reinforced area 18 at the wall 13 to a reinforced area 19 at the interior surface 101 of the shell 100 of the tire building drum 10.

Extending radially, perpendicularly-outwardly from the centre of wall 14 is a rib 20, which extends from a reinforced area 21 at the wall 14 to a reinforced area 22 at the interior surface 101 of the shell 100 of the tire building drum 10.

Extending radially, perpendicularly-outwardly from the centre of wall 16 is a rib 26, which extends from a reinforced area 27 at the wall 16 to a reinforced area 28 at the interior surface 100 of the tire building drum 10.

The other four ribs extend radially, diagonally-outwardly from an associated corner of the square-shaped core 12. Thus extending radially, diagonally from a reinforced corner 29 at the intersection of walls 13 and 14, is a rib 30 which extends to a reinforced area 31 at the interior surface 101 of the shell 100 of the tire building drum 10.

Extending radially, diagonally from a reinforced corner 32 at the intersection of walls 15 and 14, is a rib 33 which extends to a reinforced area 34 at the interior surface 101 of the shell 100 of the tire building drum 10.

Extending radially, diagonally from a reinforced corner 35 at the intersection of walls 15 and 16, is a rib 36 which extends to a reinforced area 37 at the interior surface 101 of the shell 100 of the tire building drum 10.

Extending radially, diagonally from a reinforced corner 38 at the intersection of walls 16 and 13, is a rib 39 which extends to a reinforced area 40 at the interior surface 101 of the shell 100 of the tire building drum 10.

DESCRIPTION OF THE PRODUCTION OF THE PREFERRED EMBODIMENT

The tire building drum is produced by conventional extrusion molding techniques by extruding a heat-softened supply of the selected synthetic, plastic material, e.g. polyvinyl chloride through a die. Conventional proprietary extrusion molding machines may be used; one example is the machine known by the Trademark-AMUT.

OPERATION OF PREFERRED EMBODIMENTS

Thus, a light-weight but strong tire building drum 10 is provided. Because of the nature of the material out of which the tire building drum is made, the tire carcasses may be removed therefrom without collapse of the drum. Because of the thickened reinforced areas the drum is strong and rugged. The drum may, for example, have a diameter of 6" and may have a length which varies from 1 foot to 20 feet.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be within the full range of equivalence of the following claims.

What we claim is:

1. A cylindrical tire building drum having two axial ends, said tire building drum consisting of: a non-inflatable, non-collapsible, rigid, non-reactive, vulcanization-resistant, unreinforced, synthetic thermoplastic material shell, said shell being of the same diameter between its two said axial ends and also providing a smooth surface between its two said axial ends, said shell having a) an axially-longitudinally-extending smooth outer circumferential face; b) an axially-longitudinally-extending inner circumferential face; c) a central, axially-longitudinally-extending core of a non-circular cross-section, said core having an inner, axially-longitudinally-extending face, and an outer, axially-longitudinally-extending face, said core being specially adapted for mounting said cylindrical tire building drum on a rotatable, axially-longitudinally-extending shaft of a conventional tire building machine, said core having d) a plurality of integral, fixed-length, rigid, non-movable, radially-outwardly-projecting, axially-longitudinally-extending ribs, said ribs projecting radially between said outer axially-longitudinally-extending face of said central core and said axially-longitudinally-extending inner circumferential face of said shell, each said radially-projecting, axially-longitudinally-extending rib being connected to its associated face of said axially-longitudinally-extending central core and to its associated axially-longitudinally-extending inner circumferential face of said cylindrical tire building drum at thickened area of greater cross-sectional area than the cross-sectional area of the other portions of each said rib at both side faces of each said rib, thereby to provide rugged reinforcement areas; said cylindrical tire building drum having an axially-longitudinally-extending length which varies from about 1 foot to about 20 feet.

2. The cylindrical tire building drum of claim 1 wherein said non-reactive, vulcanization-resistant, unreinforced synthetic thermoplastic material is selected from the group consisting of polyvinyl chloride, high density polyethylene, polypropylene and nylon.

3. The tire building drum of claim 1, wherein said central core is a hollow, square-shaped core; wherein eight ribs are provided; wherein four of said eight ribs extend radially, perpendicularly-outwardly from a respective side wall of the square-shaped core; and wherein the other four of said ribs extend radially, diagonally-outwardly from an associated corner of the square-shaped core.

4. The tire building drum of claim 3, wherein each said radially, perpendicularly-outwardly-extending rib extends from the centre of a respective side wall.

* * * * *